2 Sheets--Sheet 1.

F. DODGE.
Peat-Machine.

No. 159,398.     Patented Feb. 2, 1875.

Witnesses
F. White
F. Jones

Inventor:
Franklin Dodge
by J. J. Greenough Atty

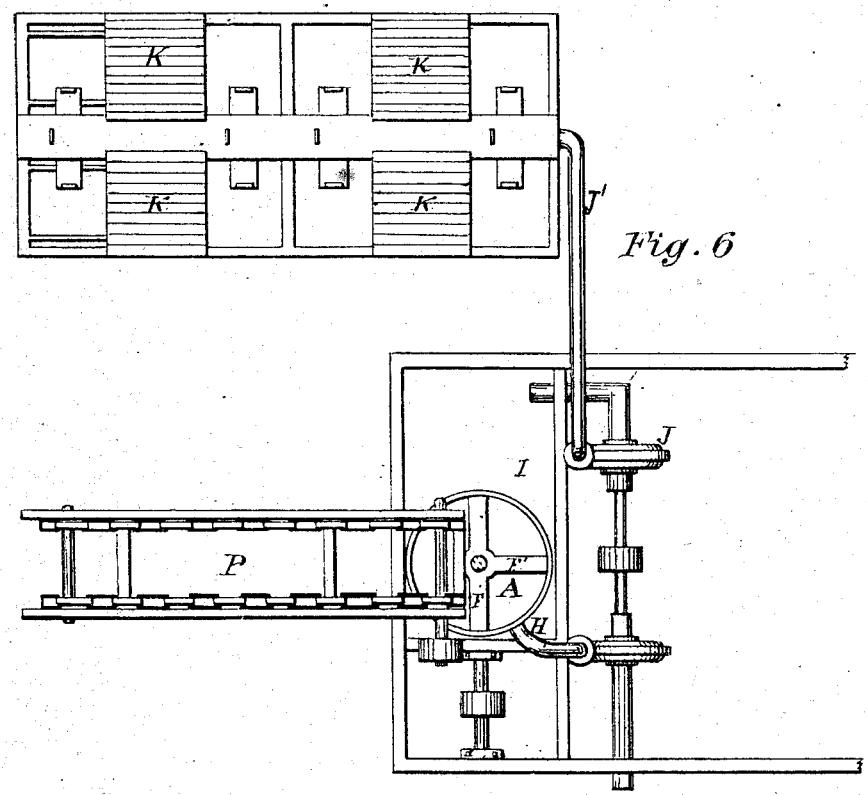

UNITED STATES PATENT OFFICE.

FRANKLIN DODGE, OF UNION GROVE, ILLINOIS.

IMPROVEMENT IN PEAT-MACHINES.

Specification forming part of Letters Patent No. 159,398, dated February 2, 1875; application filed December 14, 1874.

*To all whom it may concern:*

Be it known that I, FRANKLIN DODGE, of Union Grove, Whitesides county, in the State of Illinois, have invented certain Improvements in the Manufacture and Preparation of Crude Peat for Fuel, of which the following is a specification:

My invention has for its object the manufacture and refining of peat for fuel; and consists in subjecting the crude bog-peat first to a peculiar grinding and kneading process, by which it is mixed with water, and well puddled until the peat is thoroughly taken up and held in suspension in water. This mixture is then pumped up and forced away through pipes to any convenient distance, where it flows into a drying-ground, and spreads out over it, and is held therein by suitable dams, forming a shallow basin, where the valuable portions of the peat settle to the bottom in fine powder, and make a homogeneous mass, after which the water is drawn off, and the residuum is allowed to dry. While in the plastic state this consolidated peat residuum is cut as it lies on the ground into blocks of suitable size and shape, and when hard enough to be handled is stowed away loosely in curing-cribs, where it is protected from the weather, and is exposed to the action of the air, which circulates freely through it while going through a sweating process, and thoroughly drying to fit it for the market.

To manufacture peat as above named, I employ the machinery herein described, referring to the accompanying drawing, in which—

Figure 1:
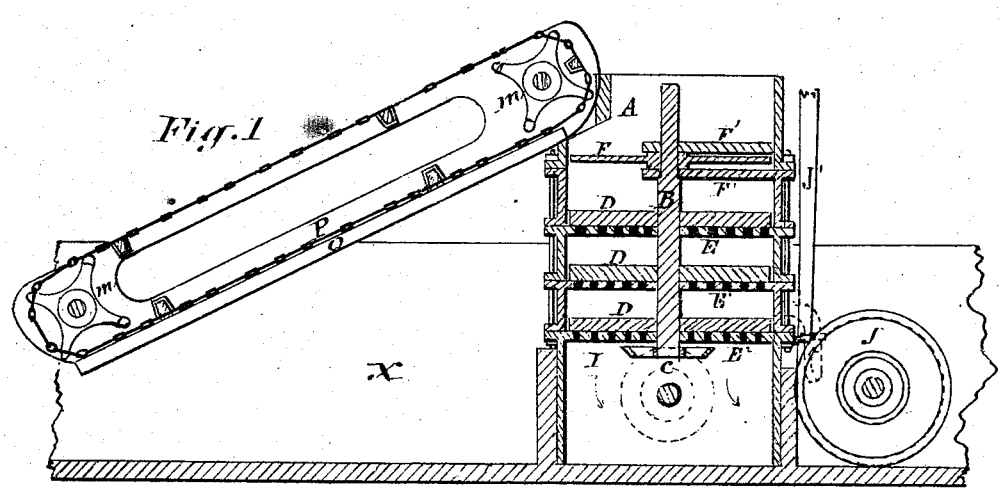
Figure 2:
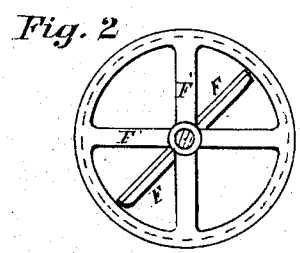
Figure 3:
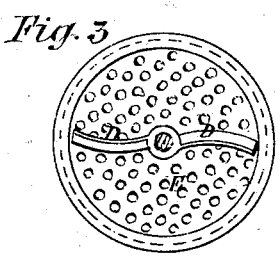
Figure 4:
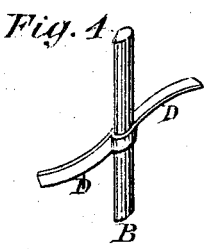
Figure 5:
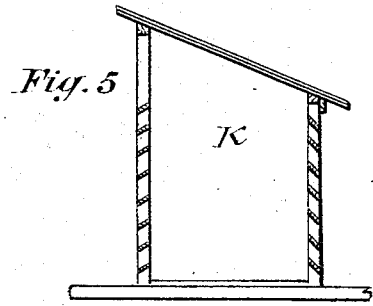

Figure 1 is a vertical section through the mill for grinding and mixing the crude peat. Fig. 2 is a sectional plan of the revolving knives and stationary cutter-bars. Fig. 3 is a sectional plan of perforated diaphram through which the peat is forced, and showing the grinding-arms. Fig. 4 is a detail of the grinding-arms. Fig. 5 is a vertical section of the curing-cribs; Fig. 6, plan of entire apparatus.

Peat in the bog, being of a spongy cellular nature, is filled with air and water. If this is allowed to dry in the condition in which it is cut from the bog without other manipulation it is generally so loose and friable as to hardly bear handling; but this is not the only or most important objection to crude peat. It is too bulky to be profitably transported, and on account of its light spongy texture it burns too quickly, unfitting it for the ordinary purposes of economical fuel.

My invention has two objects: the production of a denser and harder fuel, which is more enduring, and capable of being employed in the manufactures and elsewhere; and the reducing of the crude peat in bulk to admit of profitable transportation.

The construction of my apparatus is as follows: I employ the ordinary scow or flat boat $x\ x$, on which I place the machinery, consisting of a hopper, A, which receives the crude peat from an endless apron or carrier, M, on which it is thrown as it is dug from the bog. B is a vertical revolving shaft extending from the hopper down through a series of grinding-chambers, of which the upper one, A, contains a series of horizontal radial bars, $F'$, extending across from one side of the chamber to the other, and to the sides of which they are affixed. Between this series of stationary bars $F'$ there are revolving knives F, affixed to the shaft B. These break up and prepare the material for the next process as it falls upon a perforated diaphragm, E, (clearly seen in Fig. 3,) over which are revolving arms or grinders D, placed at an acute angle in the direction of their motion, as seen in Fig. 4. They knead and grind the material like a spatula, and force it through the holes in diaphragm E into the next chamber upon diaphragm $E^1$, where it is worked in a similar manner, and discharged through perforations upon $E^2$, and so on successively through a sufficient number to grind it into fine subdivisions, and complete the operation. The openings through each successive diaphragm being made smaller than the preceding ones, and the number being governed by the nature of the peat operated upon, after passing through the lower chamber, in which knives D work, it enters the chamber in which are the bevel-gears $c\ c$, which engage the upright with the horizontal power shaft. The material is there mixed or puddled with water forced in by a pump or otherwise from the bog through the aperture H, the bevel-gear serving as a mixer, after which the fluid mixture passes out through fine holes in diaphragm $E^3$ into the reservoir I below. The water used in puddling the ground peat is obtained by drainage from the bog; and from the large quantity used it serves to sufficiently drain it without resorting to other measures. The fluid peat and water in reservoir I is thrown out by a centrifugal or other sufficient pump, J, through a pipe, J', to the drying-ground, as before described, when, after properly settling, by which the earthy non-combustible material is separated therefrom, and draining and consolidating, it is cut, while soft, into strips with a common horse-rake, and when hardened sufficiently is placed in cribs, one of which is shown in Fig. 5, divested of all earthy and other foreign matter. The crib is made somewhat like a corn-crib, with close roof and open slatted sides, as clearly seen in the drawing, thus affording a free circulation of air through the openly-packed peat, and excluding moisture therefrom, until it is thoroughly ready for the market.

I claim as my invention—

1. The process of treating peat herein described, consisting, first, in grinding it by passing it through a series of graduated perforated disks, and kneading the peat in the peculiar manner described, then mixing the peat thus ground with water until it is taken up by the water, and then pumping the mixture away to the drying-grounds, where it is allowed to settle and condense, drawing off the water, and hardening the peat, as described, and finally storing in curing-cribs to finish the process.

2. The revolving grinders D, in combination with the graduated perforated diaphragms E, $E^1$, &c., substantially as described, and for the purposes specified.

3. The employment of a pump and conductor, in combination with the reservoir I, in which the peat is liquefied and mixed, for conveying the liquid compound automatically to the drying-grounds, as specified.

4. The combination, substantially as before set forth, of the hopper A, revolving knives F, and bars F', grinders D, perforated diaphragm E, gearing c, feed-water pipe H, reservoir I, and pump J, for the purposes specified.

FRANKLIN DODGE.

Witnesses:
   J. J. GREENOUGH,
   PETER B. McLENNAN.